(12) United States Patent
Kadambi (10) Patent No.: US 12,521,231 B2
(45) Date of Patent: Jan. 13, 2026

(54) IMPLANTABLE ACCOMODATING INTRAOCULAR LENSES, IOL IMPLANTS, AND RELATED SYSTEMS AND METHODS

(71) Applicant: Desikan Raiguru Kadambi, Edmonton (CA)

(72) Inventor: Desikan Raiguru Kadambi, Edmonton (CA)

( * ) Notice: Subject to any disclaimer, the term of this patent is extended or adjusted under 35 U.S.C. 154(b) by 12 days.

(21) Appl. No.: 17/695,009

(22) Filed: Mar. 15, 2022

(65) Prior Publication Data

US 2023/0293287 A1    Sep. 21, 2023

(51) Int. Cl.
*A61F 2/16* (2006.01)

(52) U.S. Cl.
CPC .......... *A61F 2/1624* (2013.01); *A61F 2/1616* (2013.01); *A61F 2/1627* (2013.01); *A61F 2/1694* (2013.01); *A61F 2002/1683* (2013.01); *A61F 2002/169* (2015.04); *A61F 2002/16901* (2015.04); *A61F 2002/1699* (2015.04); *A61F 2230/0019* (2013.01); *A61F 2230/0065* (2013.01)

(58) Field of Classification Search
CPC ........ A61F 2/15; A61F 2/1451; A61F 2/1624; A61F 2/1616; A61F 2/1635; A61F 2/1627; A61F 2/1694; A61F 2002/1683; A61F 2002/169; A61F 2002/16901; A61F 2002/1699; A61F 2230/0019; A61F 2230/0065
See application file for complete search history.

(56) References Cited

U.S. PATENT DOCUMENTS

| | | | |
|---|---|---|---|
| 4,159,546 A | 7/1979 | Shearing |
| 4,173,798 A | 11/1979 | Welsh |
| 4,174,543 A | 11/1979 | Kelman |
| 4,244,060 A | 1/1981 | Hoffer |
| 4,249,271 A | 2/1981 | Poler |
| 4,270,230 A | 6/1981 | Poler |
| 4,315,337 A | 2/1982 | Choyce |
| 4,424,597 A | 1/1984 | Schlegel |
| 4,446,582 A | 5/1984 | Hanna |
| 4,787,902 A | 11/1988 | Sheets |
| 4,842,601 A | 6/1989 | Smith |
| 4,878,912 A | 11/1989 | Castleman |
| 4,888,012 A | 12/1989 | Horn |

(Continued)

FOREIGN PATENT DOCUMENTS

| | | |
|---|---|---|
| CA | 2212459 | 5/2006 |
| CA | 2810754 | 9/2013 |

(Continued)

OTHER PUBLICATIONS

Mayo Clinic, screenshots taken from YouTube video Intraocular Lenses, available at least as early as May 9, 2011, 3 pages, URL = https://www.youtube.com/watch?v=9QS1YpwZVjQ.

(Continued)

*Primary Examiner* — Suzette J Gherbi
(74) *Attorney, Agent, or Firm* — Robert A. Nissen (57) ABSTRACT

An accommodation-facilitating intraocular implant has: a ring sized to fit within a capsular lens bag of an eye; and a plurality of haptics angularly spaced around and radially extended from the ring. A multi-curve implantable accommodating intraocular lens has a convex anterior and concave posterior.

16 Claims, 4 Drawing Sheets

(56) References Cited

U.S. PATENT DOCUMENTS

| | | | |
|---|---|---|---|
| 5,019,099 | A | 5/1991 | Nordan |
| 5,489,302 | A | 2/1996 | Skottun |
| 5,928,282 | A | 7/1999 | Nigam |
| 5,984,962 | A | 11/1999 | Anello |
| 6,176,878 | B1 | 1/2001 | Gwon |
| 6,302,911 | B1 | 10/2001 | Hanna |
| 6,461,384 | B1 | 10/2002 | Hoffman |
| 6,749,633 | B1 | 6/2004 | Lorenzo |
| 6,966,913 | B2 | 11/2005 | Israel |
| 7,018,410 | B1 | 3/2006 | Vazeen |
| 7,118,597 | B2 | 10/2006 | Miller |
| 8,579,971 | B2 | 11/2013 | Webb |
| 10,045,844 | B2 | 8/2018 | Smiley |
| 2003/0130733 | A1 | 7/2003 | Paul |
| 2003/0187505 | A1 | 10/2003 | Liao |
| 2004/0249456 | A1 | 12/2004 | Cumming |
| 2005/0119741 | A1 | 6/2005 | Cumming |
| 2006/0100704 | A1 | 5/2006 | Blake |
| 2007/0021831 | A1 | 1/2007 | Clarke |
| 2007/0153405 | A1 | 7/2007 | Kuiper |
| 2010/0070030 | A1 | 3/2010 | Amon |
| 2010/0106245 | A1 | 4/2010 | Rombach |
| 2011/0279905 | A1 | 11/2011 | Pugh |
| 2012/0046744 | A1 | 2/2012 | Woods |
| 2013/0238091 | A1* | 9/2013 | Danta ............... A61F 2/1648 623/6.43 |
| 2014/0005782 | A1 | 1/2014 | Kellan |
| 2014/0336757 | A1 | 11/2014 | Simonov |
| 2016/0143728 | A1 | 5/2016 | De Smet |
| 2016/0331520 | A1 | 11/2016 | Beer |
| 2019/0254809 | A1 | 8/2019 | Dworschak |
| 2021/0015604 | A1* | 1/2021 | Ma .................... G02B 1/002 |
| 2023/0293288 | A1* | 9/2023 | Kadambi .......... A61F 2/1624 623/6.37 |

FOREIGN PATENT DOCUMENTS

| | | |
|---|---|---|
| CA | 3108107 | 2/2020 |
| DE | 10125829 | 11/2002 |
| FR | 2794965 | 12/2000 |
| JP | 2005161075 | 1/2005 |
| JP | 2006034917 | 2/2006 |
| MX | 2011005583 | 10/2011 |
| WO | 2000066040 | 11/2000 |
| WO | 2007081311 | 7/2007 |
| WO | 2015044235 | 4/2015 |
| WO | 2018039353 | 3/2018 |

OTHER PUBLICATIONS

Eyesmart—American Academy of Opthalmology, screenshots taken from YouTube video Intraocular Lenses (IOLs) and Cataract Surgery, available at least as early as Jul. 29, 2016, 3 pages, URL = https://www.youtube.com/watch?v=Ui9ylzckiDg.

Google, screenshot of Google image search results for "Intraocular lens", available at least as early as XXX, 1 page.

Douglas Grayson, The Ins and Outs of Lens Explantation, Oct. 4, 2011, Review of Opthalmology, 6 pages, URL = https://www.reviewofophthalmology.com/article/the-ins-and-outs-of-lens-explantation.

Sonia Kelley, Accommodating Intraocular Lenses (IOL) for Cataract Surgery, Available at least as early as Feb. 2019, 6 pages, URL= https://www.allaboutvision.com/conditions/accommodating-iols.htm.

Medhelp, comments and replies in Eye Care Communities board, Available at least as early as Dec. 10, 2007, 14 pages, URL = https://www.medhelp.org/posts/Eye-Care/Many-problems-with-Crystalens/show/374063.

Enette Ngoei, The pros and cons of multifocal and accommodating IOLs, available at least as early as Feb. 2008, 4 pages, URL = https://www.eyeworld.org/article-the-pros-and-cons-of-multifocal-and-accomodating-iols.

Einstein Medical, Crystalens, Available at least as early as Sep. 6, 2017, 5 pages, URL = https://www.docshop.com/education/vision/refractive/iol/crystalens.

Reviews Talk, Consumer reviews of CRYSTALENS, Available at least as early as Jan. 25, 2012, 9 pages, URL = https://www.reviewstalk.com/complaints-reviews/crystalens-19810.html.

Complaint Board, Consumer complaints and reviews about CRYSTALENS, available as early as Jan. 1, 2016, 5 pages, URL = https://www.complaintboard.com/crystalens-1317.html.

Health Boards Health Message Boards, Crystalens problems message board, available as early as Oct. 2007, 8 pages, URL = https://www.healthboards.com/boards/eye-vision/539837-crystalens-problems.html.

Machine Translation of JP2006034917, published Feb. 9, 2006, 7 pages.

Eyesmart—American Academy of Opthalmology, screenshots taken from YouTube video: Intraocular Lenses (IOLs) and Cataract Surgery, available at least as early as Jul. 29, 2016, 4 pages, URL = https://www.youtube.com/watch?v=Ui9ylzckiDg.

Google screenshots of Google Image search results for "Intraocular lens", available at least as early as Apr. 3, 2020, 1 page.

Machine Translation of DE10125829, published Nov. 28, 2002, 3 pages.

Machine Translation of JP2005161075, published Jun. 23, 2005, 15 pages.

* cited by examiner

IMPLANTABLE ACCOMODATING INTRAOCULAR LENSES, IOL IMPLANTS, AND RELATED SYSTEMS AND METHODS

TECHNICAL FIELD

This document relates to implantable accommodating intraocular lens (IOLs), IOL implants, and related systems and methods.

BACKGROUND

The following paragraphs are not an admission that anything discussed in them is prior art or part of the knowledge of persons skilled in the art.

Multifocal or monofocal intraocular lenses (IOLs) may be inserted in the capsular lens bag of the eye to provide improved vision at a variety or a single focal distance. Accommodating lenses such as the Crystalens™ fit within the capsular lens bag via haptics. The dioptric power range of the lens is inherently limited by the degree the lens can move or adjust.

SUMMARY

An accommodation-facilitating intraocular implant is disclosed comprising: a ring sized to fit within a capsular lens bag of an eye; and a plurality of haptics angularly spaced around and radially extended from the ring.

An accommodating intraocular lens (IOL) assembly is disclosed comprising: an implantable accommodating intraocular lens (IOL) within a capsular bag of an eye, the implantable accommodating IOL having an optic lens and a plurality of IOL haptics angularly spaced around and radially extended from the optic lens; and an accommodation-facilitating intraocular implant comprising a ring fitted within the capsular lens bag of an eye, anterior to and in contact with the optic lens.

A method comprising inserting the accommodation-facilitating intraocular implant into a capsular lens bag of an eye.

A method comprising: inserting an accommodation-facilitating intraocular implant into a capsular lens bag of an eye, into contact with and anterior to an intraocular lens (IOL) that is also within the capsular lens bag, in which the accommodation-facilitating intraocular implant is inserted through an incision in an anterior portion of the capsular lens bag, to position the accommodation-facilitating intraocular implant such that: a plurality of haptics of the accommodation-facilitating intraocular implant are inserted into and follow a circumferential groove of the sulcus to grip the sulcus; and under contraction and expansion of ciliary muscles of the eye, the plurality of haptics move to adjust the ring along an optical axis of the eye to adjust a dioptric power of the IOL to accommodate a focal power of the eye.

An implantable accommodating intraocular lens (IOL) comprising: an optic lens sized to fit within a capsular lens bag of an eye; a plurality of haptics angularly spaced around and radially extended from the curved optic lens, with each haptic being structured to move, under contraction and expansion of the ciliary muscles of the eye, to adjust the optic lens to accommodate a focal power of the eye; in which: the optic lens defines a posterior face and an anterior face; the posterior face has a concave profile; and the anterior face has a convex profile.

A method comprising inserting the accommodation-facilitating intraocular implant into a capsular lens bag of an eye, through an incision in the capsular lens bag, such that the arcuate sulcus gripping parts of the plurality of haptics insert into and follow the circumferential groove of the sulcus to grip the sulcus.

In various embodiments, there may be included any one or more of the following features: An inner annular edge of the ring defines an open void center. A portion of the ring defined between inner and outer annular edges of the ring has a rectangular cross-sectional shape defined in a plane parallel with a central axis defined by the ring. A radial width, of an intraocular-lens-contacting annular posterior face opposite an annular anterior face of the ring, is greater than an axial thickness defined between the intraocular-lens-contacting annular posterior face and the annular anterior face. A radial width is four or more times greater than axial thickness. A radial width, of an intraocular-lens-contacting annular posterior face opposite an annular anterior face of the ring, is smaller than a radius of an open void center defined by the inner annular edge of the ring. Outer and inner annular edges of the ring have a circular shape. A material of the ring is rigid or resilient. A ring comprising one or more of poly(methyl methacrylate) (PMMA) or stainless steel. A ring comprises ultraviolet (A and B) absorbing material. Each haptic: has a tongue that forms an arcuate sulcus gripping part that, in use within the capsular lens bag, inserts into and follows a circumferential groove of the sulcus to restrict circumferential sliding of the tongue around the sulcus; and is structured to move, under contraction and expansion of the ciliary muscles of the eye, to adjust the ring along an optical axis of the eye. Each haptic is attached to an annular anterior face of the ring. A plurality of implant haptics angularly spaced around and radially extended from the ring. A plurality of implant haptics are inserted into the circumferential grove of the sulcus anterior relative to the plurality of IOL haptics. A plurality of implant haptics are configured to bias the ring in a posterior direction under contraction of the ciliary muscles of the eye to press upon the IOL and thereby increase a dioptric power of the IOL. An inner diameter of the ring is smaller than an outer diameter of the IOL; and an outer diameter of the ring is larger than the outer diameter of the IOL. A convex profile of the anterior face has a greater degree of curvature than the concave profile of the posterior face. A plurality of haptics is attached to the anterior face of the IOL. A plurality of haptics are configured to bias the IOL in a posterior direction under contraction of the ciliary muscles of the eye to increase a dioptric power of the IOL. An IOL comprises a material of a high refractive index. An implantable accommodating IOL being positioned such that an outer edge of the implantable accommodating IOL is posterior an iris of the eye of the user. An IOL is positioned relatively more anterior decreases a night glare experienced be the user. A concave curvature of the posterior face increases a dioptric power when the IOL is moved in a backward direction. A convex curvature of the anterior face increasing the dioptric power of the IOL and increases a force of the papillary constriction in order to move the IOL in the backward direction.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

In FIG. 8 the AFSI and IOL combination are moved forward relative to the position the AFSI and IOL adopts in FIG. 7.

In FIG. 9 the AFSI and IOL combination are moved forward relative to the position the AFSI and IOL adopts in FIG. 9.

In FIG. 16 the MCLI is moved forward relative to the position the MCLI adopts in FIG. 15.

DETAILED DESCRIPTION

Immaterial modifications may be made to the embodiments described here without departing from what is covered by the claims.

Problems with vision may take numerous forms. These include myopia (nearsightedness), hyperopia (farsightedness) as well as cataracts (opacification of the lens). Contact lenses and glasses containing refractive lenses are commonly used for basic correction of myopia, hyperopia, and astigmatism. Both contact lenses and glasses represent non-permanent solutions that are susceptible to loss, breakage and require cleaning in order to maintain efficacy.

An implantable intraocular contact lens, known as an IOL, is a surgical implantation used to permanently improve an eyesight condition, such as myopia, hyperopia or cataracts. An IOL incorporates a corrective lens tailored and structured to the degree of vision impairment desired to be corrected. An IOL solution may be a viable option for a patient who has a condition that would otherwise disqualify them from alternative laser-assisted in situ keratomileusis (LASIK) treatment such as: thin corneas, dry eyes or astigmatism (imperfection in the curvature of the lens). An IOL may be considered and used as a permanent vision correction solution, but may be removed or adjusted to address any change in efficacy or in a patient's vision deficit.

Two types of IOL solutions exists—phakic and pseudophakic. With a phakic solution ('phakic' meaning "having a lens") the eye's natural lens is left untouched. Intraocular lenses that are implanted into eyes after the eye's natural lens has been removed during cataract surgery are known as pseudophakic. Phakic intraocular lenses are indicated for patients with high refractive errors when the usual laser options for surgical correction (LASIK and PRK) are contraindicated. Phakic IOLs may be designed to correct high myopia ranging from −5 to −20 D if the patient has enough anterior chamber depth (ACD) of at least 3 mm. The most common type of IOL is the pseudophakic IOL, which may be implanted after the eye's natural lens has been removed. The pseudophakic IOL provides the same light focusing function as the natural crystalline lens. A pseudophakic IOL may be available as: monofocal (focus on only one distance), multifocal (for example bifocal), or accommodating (permits focus changing).

An IOL may contain non-optic side struts known as haptics. A haptic may be the part of an IOL responsible for its attachment to the ciliary muscles or suspensory ligaments called lens zonules, which are connected to both the ciliary muscle and natural crystalline lens within the capsular lens bag of the eye. Haptics may use hinges at its ends to aid in attaching to the ciliary muscles or zonules. In any given IOL, the haptics may vary in number and shape, including having loops or hooks, for example having loops to sew into the ciliary sulcus of the eye.

Accommodation is how an eye may change optical power to maintain a clear image as the eye focuses on objects at different distances. When the eye focuses on an object that is relatively far away, the ciliary muscles may relax, leading to the lens zonules becoming taut, leading to a flattening of the natural crystalline lens. When the eye focuses on an object that is relatively near an individual, the ciliary muscles may contract, leading to the lens zonules slackening, reducing tension upon the natural crystalline lens, making the lens more convex.

An IOL may be designed to use non-optical elements known as haptics to connect to the ciliary muscles or zonules of the eye, allowing for accommodation to occur. With an accommodating IOL, the accommodation process may occur as a result of one or more of a change in the shape of the lens or a change in the position of the lens relative to the lens capsule. In the case of the former (change in lens shape causing accommodation), similar to the natural crystalline lens, when viewing an object that is relatively nearby, the ciliary muscles may contract, resulting in reduced tension on the haptics, resulting in the lens becoming convex in shape. As well, when viewing an object that is relatively far away, the ciliary muscles relax, increasing the tension on the haptics and flattening the natural crystalline lens. In the case of the latter (movement of lens causing accommodation), accommodation may occur through the haptics changing the position of the lens anterior or posterior relative to the lens capsule. When viewing an object that is relatively nearby, for example a book held at arm's length, under the tension of the contracted ciliary muscles the haptics may push the lens in an anterior direction, moving the lens relatively closer to the pupil. When viewing an object that is far away, the ciliary muscles may relax, resulting in the haptics pushing the lens in a posterior direction, moving the lens relatively further from the pupil. It is through such anterior-posterior movement of the lens that accommodation may be achieved in a manner analogous to that of the natural eye.

In contrast to accommodation, a static or non-accommodating IOL may be used, for example with a monofocal or multifocal lens. A monofocal lens may only focus at a single distance, for example a distance over 20 meters to correct only distance vision. A multifocal IOL may have plural regions that each focus at different relative distances, for example two or three focal regions spaced throughout the lens simultaneously based on the position of the pupil. In some cases, the central part of the lens may be designed for focusing on nearby objects, while the outer regions of the lens may be structured for focusing on far away objects. When viewing a nearby object, the pupil of the eye may constrict and the central region of the IOL may be used, while for far away viewing the pupil dilates and an outer IOL focal region may be used.

Some newer lens designs attempt to allow the eye to regain some partial focusing ability in order to change focus from distance to near via accommodation. However, many accommodating IOLs used today only achieve a very limited improvements in near vision which reduced over time. Accommodative IOLs may also have a slightly higher risk of developing posterior capsule opacification (PCO), though there is some uncertainty around this finding. PCO is a common side-effect of many cataract surgeries and is easily treatable with a one-time laser capsulotomy procedure. Accommodating IOLs interact with ciliary muscles and zonules, using hinges at both ends to latch on and move forward and backward inside the eye using the same mechanism as normal accommodation. The haptic hinges may be made of an advanced silicone called BioSil that has been thoroughly tested to make sure it is capable of unlimited flexing in the eye.

An IOL may be implanted in a surgical procedure. A surgeon may use drugs to dilate the pupil of the patient. A cut may be made into the cornea and anterior capsular lens bag of the eye, where the natural crystalline lens is contained, to facilitate the insertion of surgical tools and an IOL. The natural crystalline lens may be destroyed in what is known as a pseudophakic procedure, by a suitable technique such as the use of a laser or ultrasound. In some cases, it may be unnecessary to destroy the crystalline lens, such as where the crystalline lens has already been removed or destroyed in a previous procedure, as might be the case where an IOL is being replaced or upgraded. Alternatively, in a phakic procedure the natural crystalline lens may be kept intact. An IOL may then be inserted into the capsular lens bag. Insertion may be achieved by folding the IOL and inserting it through the cut made in the anterior lens capsule lens, assuming that the IOL is made with flexible material. The non-optic haptics may contact the sulcus of the eye.

There may be various problems with IOLs. Stiff haptics may impair the ability of the ciliary muscles to change the shape of the lens. Stiff haptics may further make it difficult to remove an IOL if a patient elects to do so after having a phakic procedure. Lens zonules may drive accommodation as opposed to the ciliary muscles, reducing the eye's ability to accommodate as following the initial cut into the anterior lens capsule the zonular system may not perform as efficiently as pre-surgery to change the shape of the lens. IOLs may need to be tailored in size to a patient's eye, and thus would not be considered to be one-size-fits-all. As the sulcus shape to which the IOL must match cannot be accurately measured, a surgeon may implant either too large of an optic lens, which will resist ciliary muscle action, or too small of an optic lens, in which the ciliary muscle may not accommodate properly or at all.

Referring to FIGS. 1-10, an accommodation-facilitating intraocular implant 88 (which may be referred elsewhere in this document as an AFSI), may be used to assist in the accommodation of an accommodating intraocular lens (IOL). The accommodation-facilitating intraocular implant 88 may comprise a ring 90. The implant 88 may also have a plurality of haptics 104. The ring 90 may be sized to fit within a capsular lens bag 24 of an eye 10. The plurality of haptics 104 may be angularly spaced around (for example around an optical axis 11, which is discussed herein as defined by the eye, but may also for convenience of discussion be referred to as being defined by the ring 90 and/or the IOL 50) and radially extended from the ring 90. The implant 88 may be used with an accommodating or non-accommodating IOL 50, and with mono or multi-focal IOLs. The implant 88 may have no dioptric power. The use of the ring 90 pushes the lens 54 backward toward the retina in use, allowing a user to experience relatively improved near vision. The lens may have a fixed dioptric power, or in the case of flexible IOLs such as made of foldable silicon, may slightly increase the dioptric power of the lens in use. In some cases, the IOL may comprise flexible or pliable material, such as a liquid, solid, or gel.

Referring to FIGS. 2 and 7-10, the accommodation-facilitating intraocular implant 88 may form part of an accommodating IOL assembly 126. An accommodating IOL assembly 126 may include an implant 88 and the IOL 50. The implant 88 may be referred to as a secondary implant, as such may be inserted to assist an existing IOL 50. The accommodating IOL assembly 126 may comprise an implantable accommodating IOL 50, which may comprise an optic lens 54. The IOL 50 may also comprise a plurality of IOL haptics 52 angularly spaced around (for example around optical axis 11 defined by the IOL 50 and/or eye and/or ring 90) and radially extended from the optic lens 54. The ring 90 may be fitted within the capsular lens bag 24 of the eye 10 in use, for example anterior to and in contact with the optic lens 54.

Referring to FIGS. 7-10, the accommodation-facilitating intraocular implant 88 may be inserted within the capsular lens bag 24 of an eye 10 in a method of use. Once the intraocular implant 88 is within the lens bag 24, the implant 88 may be placed anterior to and in contact, for example direct or indirect, with the lens 54 of the IOL 50 that is also with in the lens bag 24. The accommodation-facilitating intraocular implant 88 may be inserted during surgery through an incision in an anterior portion of the capsular lens bag 24, to position the accommodation-facilitating intraocular implant 88. During the positioning of the intraocular implant 88, the plurality of haptics 104 of the accommodation-facilitating intraocular implant 88 are inserted into and may follow a circumferential groove 33 of the sulcus 32 to grip the sulcus 32. Once the haptics 104 of the intraocular implant 88 are positioned in the sulcus 32, under contraction and expansion of ciliary muscles 28 of the eye, the plurality of haptics 104 may be biased by the ciliary muscles 28 to adjust the ring 90 along an optical axis 11 of the eye 10 to adjust a dioptric power of the IOL 50 to accommodate a focal power of the eye 10.

Referring to FIGS. 1-10, the accommodation-facilitating intraocular implant 88 may have a suitable structure. The ring 90 may comprise any suitable shape, such as a circular shape, elliptical shape, or an oblong shape. The ring 90 of the implant 88 may define an inner annular edge 91, an outer annular edge 95, an annular anterior face 100, and an intraocular-lens-contacting annular posterior face 102. The inner annular edge 91 may define an open void center 93 of the ring 90. The void center 93 may allow the light entering 78 the eye 10 to pass through unhindered toward the lens 54 of the IOL 50. Referring to FIGS. 6-10, a portion of the ring 90 defined between the inner annular edge 91 and the outer annular edge 95 may have a rectangular cross-sectional shape, for example defined in a plane (the plane is understood as being the plane of the page in FIGS. 6-10) parallel with a central axis 11 defined by the ring and/or eye. The rectangular shape may include rounded corners, and in some cases nominal curvature of sides. In some cases, the cross-sectional shape of the ring may follow a circle, oval, ellipse, or other shape. The outer annular edge 95 of the ring 90 may allow the ring 90 to define an outer diameter 94. The ring 90 may define a variety of dimensions, such as inner and outer diameters 92 and 94 defined by the inner and outer annular peripheral edges 91 and 95, respectively. A radial width 96, which may be defined between a radius 94A defined by the outer annular edge 95 and a radius 93A defined by the inner annular edge 91. The radial width 96 may be greater than an axial ring thickness 98, which may be defined between the annular faces 100 and 102. The radial width 96 may be four or more times greater than the axial thickness 98. The radial width 96 may be smaller than a radius 93A of the open void center 93.

Referring to FIGS. 1-10, the accommodation-facilitating intraocular implant 88 may be formed of suitable material. The intraocular implant 88, for example the ring 90, may comprise a rigid or resilient material. The material of the ring 90 being rigid or resilient may allow the ring 90 to act on the lens 54 of the IOL 50 as intended, for example by pressing against and deforming and/or moving the lens 54 to a greater extent than if the implant 88 was not present. The implant 88 may be made of a material that is relatively more rigid than the material of the lens 54. The ring 90 may comprise any suitable rigid material, such as one or more of poly(methyl methacrylate) (PMMA) or stainless steel. PMMA is already approved for implantation in the human eye 10. The ring 90 may comprise ultraviolet (A and B) absorbing material, for example transparent or opaque to visual light, and/or may be tinted.

Referring to FIGS. 1-6, as above, the accommodation-facilitating intraocular implant 88 may have a plurality of implant haptics 104 angularly spaced around and radially extended from the ring 90. The haptics 104 may define an anchor end 106 and a sulcus end 110. Each haptic 104 may have a tongue 108, which may form a suitable sulcus gripping part 120, such as an arcuate sulcus gripping part. The sulcus gripping part 120 may be present at the sulcus end 110 of the haptics 104. Each haptic 104 may comprise an arm 116, which may connect the anchor end 106 and the sulcus end 110. The sulcus end 110 of the haptics 104 may define a suitable gripping profile, such as an indented profile 112, for example with scallops, protrusions, contours, textures, or other physical or chemical structures that increase the friction between the sulcus 32 and the part 120. The anchor end 106 of the haptic 104 may connect the haptic 104 to the ring 90, for example as shown where the anchor end 106 attaches each haptic to the annular anterior face 100 of the ring 90. In some cases, the haptics 104 may be attached to the posterior face or edge of the ring 90.

Figure 1:
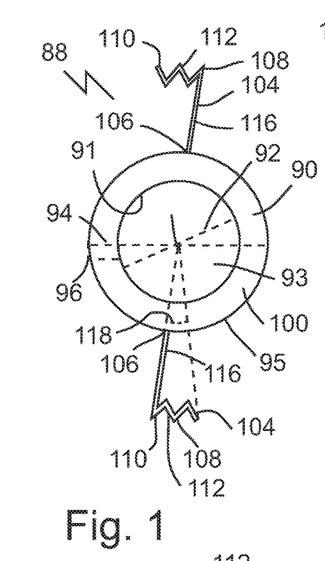
FIG. 1 is a front elevation view of an accommodation facilitating secondary implant (AFSI), having a ring and two opposed haptic arms, with a plurality of protrusions along respective sulcus gripping parts.
Figure 2:
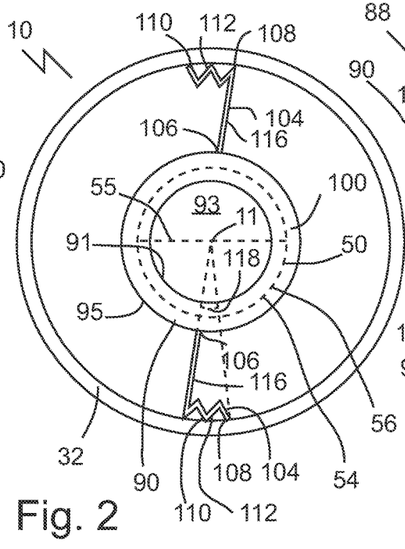
FIG. 2 is a front elevation view, partially in section of the AFSI of FIG. 1 positioned in a human eye, anterior to an intraocular lens (IOL) identified in dashed lines, with the ring haptics gripping the sulcus.
Figure 3:
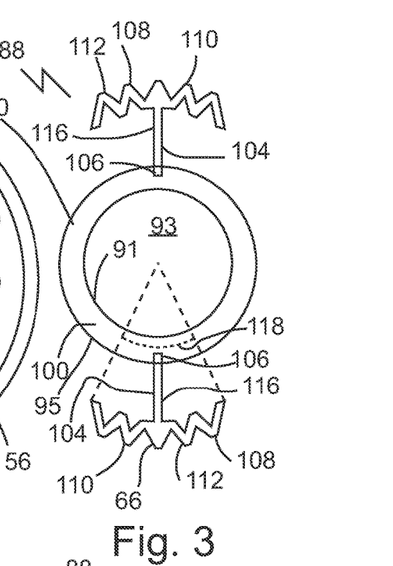
FIG. 3 is a front elevation view of a second embodiment of an AFSI, having a ring and two opposed arcuate haptic arms with a plurality of protrusions along respective arcuate sulcus gripping parts.
Figure 4:
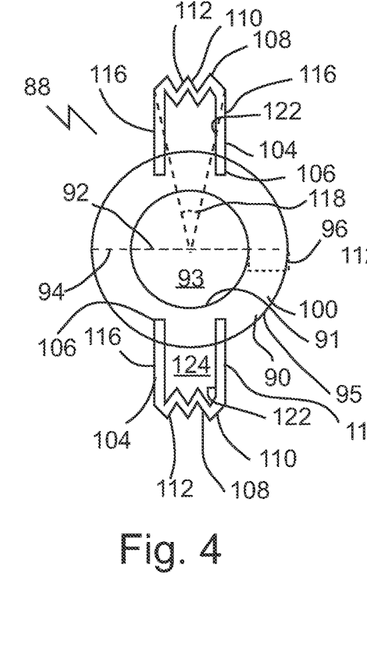
FIG. 4 is a front elevation view of a third embodiment of an AFSI, having a ring and two opposed haptic arm assemblies, each formed of dual arms that form a haptic bridge, with a plurality of convex protrusions along respective sulcus gripping parts.
Figures 5, 6:
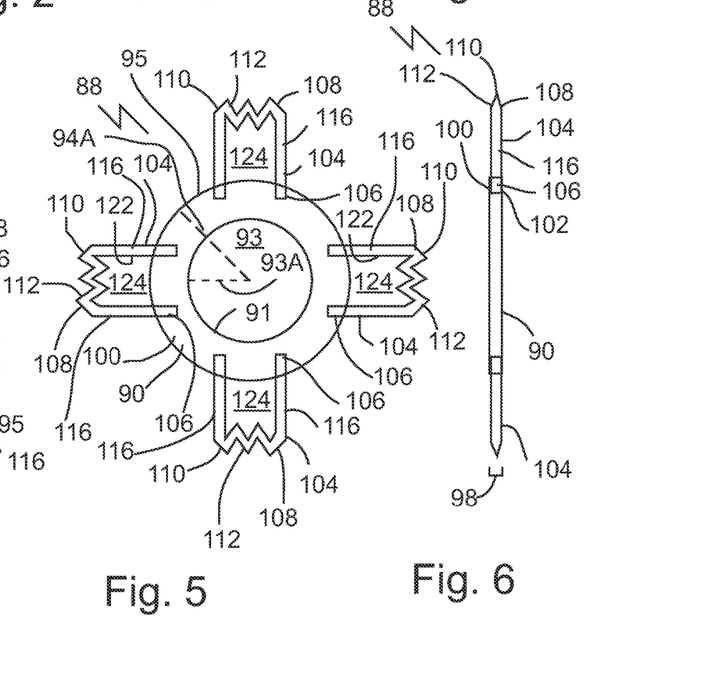
FIG. 5 is a front elevation view of a fourth embodiment of an AFSI, having a ring and four haptic arm assemblies from FIG. 4, with a plurality of convex protrusions along respective sulcus gripping parts.
FIG. 6 is a side elevation view of an AFSI.
Figures 7, 8:
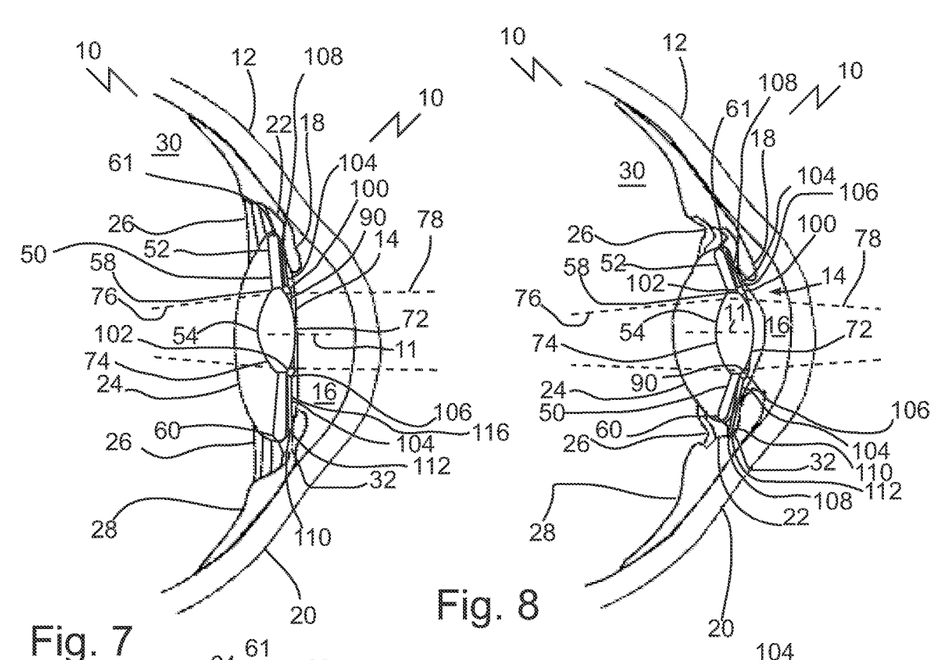
FIG. 7 is a cross-sectional side view of an embodiment of an AFSI positioned in a human eye after the removal of the natural crystalline lens and the addition of an implantable accommodating IOL, in which the ciliary muscles are shown relaxed, with the lens zonules taut, such that the IOL is accommodating for far-sighted viewing of a distant focal point, with focal lines of light illustrated with dashed lines and travelling from the focal point and through the AFSI and IOL combination.
FIG. 8 is a cross-sectional side view of the AFSI, IOL and eye combination of FIG. 7 in which the ciliary muscles are contracted and the lens zonules are slacked, such that the lens is accommodating for near-sighted viewing of a nearby focal point (relative to the focal point in FIG. 7), with focal lines of light illustrated with dashed lines and travelling from the focal point and through the AFSI and IOL combination.
Figure 9:
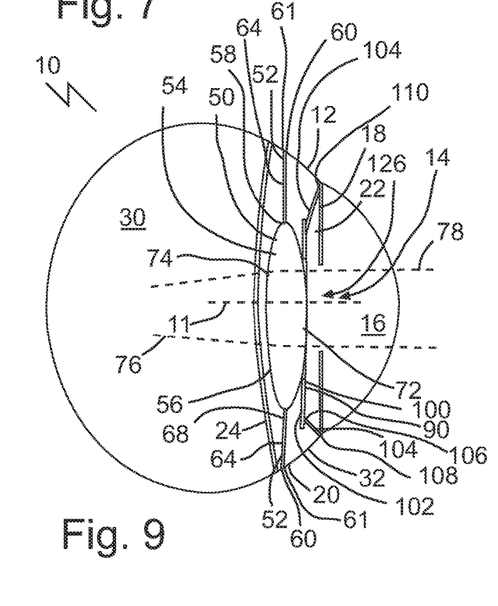
FIG. 9 is a cross-sectional side view of an embodiment of an AFSI positioned in a simplified human eye after the removal of the natural crystalline lens and the addition of an implantable accommodating IOL, in which the ciliary muscles are shown relaxed, such that the lens is accommodating for far-sighted viewing of a distant focal point, with focal lines of light illustrated with dashed lines and travelling from the focal point and through the AFSI and IOL combination.
Figure 10:
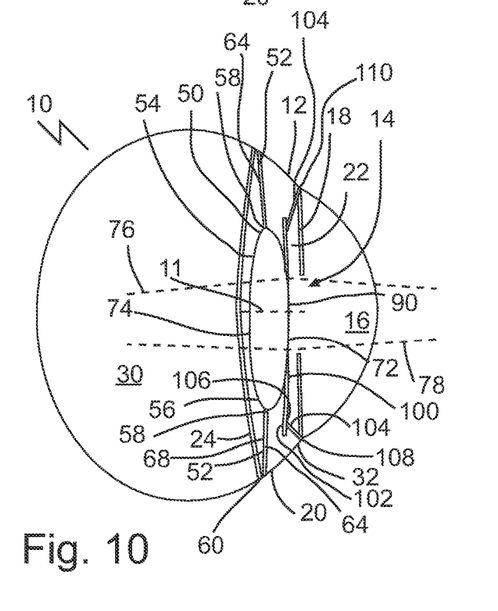
FIG. 10 is a cross-sectional side view of the AFSI, IOL and eye combination of FIG. 9, in which the ciliary muscles are contracted, such that the lens is accommodating for near-sighted viewing of a nearby focal point (relative to the focal point in FIG. 9), with focal lines of light illustrated with dashed lines and travelling from the focal point and through the AFSI and IOL combination.

Referring to FIGS. 1-6, the haptics 104 of the ring 90 may take a variety of forms. The haptics 104 may form cantilevers, for example made up of single arms 116 (FIGS. 1-3), dual arms 116 forming bridges (FIGS. 4-6), and other designs. Referring to FIGS. 1-3, the haptics 104 with a single arm 116 may have an indented profile 112 at the sulcus end 110 extend in one lateral (partially circumferential) direction (FIGS. 1-2), or in two lateral directions (FIG. 3), or more. The gripping part 120, for example the indented profile 112 of same, may extend laterally an arc length of suitable distance, for example defined by an angle 118 referring to an angular distance partially around the optical axis 11. An indented profile 112 or part 120 that is extended in opposing lateral directions about the arm stem may define a greater arc angle 118 than in the case of extension in one lateral direction. Referring to FIGS. 4-5, the arms 116 of multi-armed haptics 104 may be connected at the sulcus end 110, forming a haptic bridge. The double armed 116 haptic 104 may be anchored to the ring 90 at the anchor end 106 of both arms 116. The ring 90, double arms 116 and the indented profile 112 of the haptic may define a cutout or gap 124, which may be defined by the inner edge 122 of the haptic 104. The plurality of haptics 104 may be angularly spaced about axis 11 at suitable intervals around the ring 90. In the examples shown in FIGS. 1-3, a pair of the single arm 116 haptics 104 are shown directly across the ring 90 from each other, while in FIG. 4, a pair of the double armed 116 haptics 104 are shown directly across the ring 90 from each other, and in FIG. 5 four of the double armed 116 haptics 104 are shown evenly spaced around the ring 90. The arrangement of the haptics 104 is not limited to the embodiments shown, for example, single arm 116 haptics 104 are able to be arranged in a similar fashion as the double armed 116 haptics 104. In the example shown, the haptics 104 are shown spaced evenly around the ring 90, however, the spacing of the haptics 104 may vary, and the haptics 104 do not have to be evenly spaced around the ring 90.

Referring to FIGS. 1-6, the accommodation-facilitating intraocular implant 88 may have a suitable number and arrangement of haptics 104. For example, in FIG. 1, the embodiment has two haptics 104, opposed from one another. In FIG. 5 the implant 88 has four haptics 104. A relatively increased number of haptics 104 may help distribute the force of the ciliary muscles 28 evenly across the ring 90, thereby leading to more effective use of the implant 88 as opposed to only two haptics 104. Any suitable number of haptics 104 may be used. In some cases, the accommodation-facilitating intraocular implant 88 may have between two and eight haptics 104.

Referring to FIGS. 7-10, when the implant 88 is inserted in to the lens bag 24 of the eye 10, the haptics 104 may be inserted into and follow a circumferential groove 33 of the sulcus 32 to restrict circumferential sliding of the tongue 108 around the sulcus 32. The haptics 104 may be structured to be biased, for example move, under contraction and expansion of the ciliary muscles 28 of the eye, to press against and adjust the ring 90 along an optical axis 11 of the eye 10. The plurality of haptics 104 of the implant 88 may be inserted into the circumferential groove 33 of the sulcus 32 anterior relative to the plurality of haptics 52 of the IOL 50. The haptics 104 of the implant 88 may be configured to cause the ring 90 to move or be biased in a posterior direction under contraction of the ciliary muscles 28. The biasing or movement of the ring 90 in the posterior direction may cause the ring 90 to press upon the IOL 50, and thereby increase a dioptric power of the IOL 50.

Referring to FIGS. 2 and 7-10, the ring 90 may be appropriately sized to act upon the lens 54 of the IOL 50. The inner diameter 92 of the ring 90 may be smaller than an outer diameter 55 of the lens 54 of the IOL 50. The outer diameter 94 of the ring 90 may be larger than the outer diameter 55 of the lens 54 of the IOL 50. The inner diameter 92 and the outer diameter 94 of the ring 90 may be structured to allow for the posterior face 102 of the ring 90 to contact, and in at least projection, overlap the edge 56 of the lens 54 of the IOL 50. The overlap of the ring 90 onto the outer edge 56 of the lens 54 may allow the ring 90 to push the IOL 50 in a backward direction when a ciliary muscle 28 contracts.

Referring to FIGS. 7-10, the accommodation-facilitating intraocular implant 88 may be implanted via a suitable method. Prior to inserting the accommodation-facilitating intraocular implant 88, an incision may be formed into the cornea 12 and anterior chamber 16 of the eye 10. This method may not need to be performed if a patient has a pre-existing incision in the anterior chamber 16, for example if they previously had phakic or pseudophakic surgery and were simply adding the accommodation-facilitating intraocular implant 88 to an already existing implantable accommodation IOL 50. A surgeon may use a suitable tool to make the incision, for example lasers. The anterior chamber 16 incision may be used for the insertion of the accommodation-facilitating intraocular implant 88.

Referring to FIGS. 7-10, a suitable implantation method may incorporate the destruction or removal of the natural crystalline lens of the eye 10. Such a method may be performed in a pseudophakic surgery, such as for the removal of a cataract, where the natural crystalline lens of the eye 10 must be destroyed and/or removed. The natural crystalline lens of the eye 10 may be destroyed using a suitable technique, such as using ultrasound waves through phacoemulsification. The process of phacoemulsification may use an ultrasonic probe to break up and emulsify the natural crystalline lens into liquid using the energy of ultrasound waves. The resulting emulsion may be vacuumed out through the use of surgical tools. Alternatively, a laser may be used to soften the natural crystalline lens as it is broken up before phacoemulsification is performed to remove it. Using lasers to soften followed by ultrasound to break up may help to ensure there are no sharp-edged debris formed as a result of the destruction of the natural lens, as such debris could otherwise cause damage to the eye 10 during the removal of the natural lens from the capsular lens bag 24.

Referring to FIGS. 7-10, an implantation method may involve inserting the intraocular implant 88 into a capsular lens bag 24 of an eye 10, into contact with and anterior to the IOL 50 that is also within the capsular lens bag 24. The implant 88 may be inserted coaxial with the IOL 50, for example coaxial with optical axis 11 defined by the eye. The accommodation-facilitating intraocular implant 88 may be inserted through an incision in an anterior portion of the capsular lens bag 24. The intraocular implant 88 may also be inserted into the eye 10 as part of the IOL assembly 126, or independently if the implant 88 is being inserted into an eye 10 that already has an IOL 50 installed. The accommodation-facilitating intraocular implant 88 may be positioned such that the plurality of haptics 104 of the accommodation-facilitating intraocular implant 88 are inserted into and follow the circumferential groove 33 of the sulcus 32 to grip the sulcus 32. During under contraction and expansion of ciliary muscles 28 of the eye 10, the plurality of haptics 104 may move to adjust the ring 90 along an optical axis 11 of the eye 10 to adjust a dioptric power of the IOL 50 to accommodate a focal power of the eye 10.

Referring to FIGS. 11-16 a variation of an IOL 50 is shown, which may be referred to as a mixed curved implantable accommodating intraocular lens (IOL) 50. The IOL 50 may have a mixed curved optic lens 54. The optic lens 54 may define a posterior face 74, which may have a concave profile, such as a concave cross-sectional profile 75 defined in a plane parallel with the optical axis 11. The optic lens 54 may define an anterior face 72, which may have a convex profile, such as a convex cross-sectional profile 73 defined in a plane parallel with the optical axis 11 (the plane is understood as referring to the plane of the page in the embodiments). The faces 72 and 74 may have a suitable convex and concave, respectively, profile shape, for example a semi-circular, arcuate, bell, conical, or other shape including complex shapes. The posterior face 74 may have another suitable shape, such as a flat or convex shape in some cases.

Figure 11:
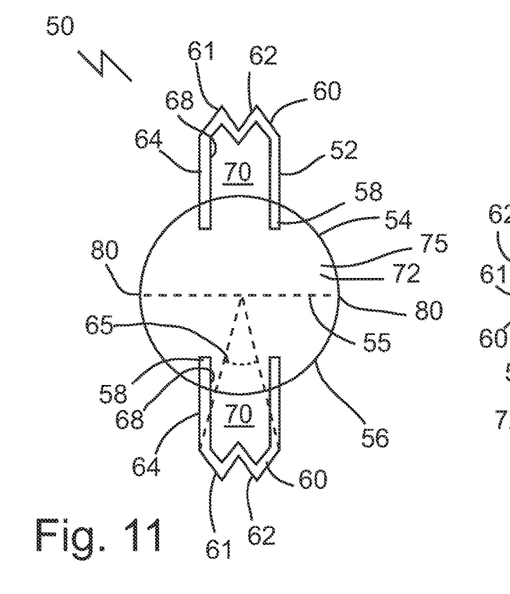
FIG. 11 is front elevation view of a mixed curvature lens implant (MCLI) having an optic lens and two opposed haptic arm assemblies each forming a haptic bridge, with a plurality of protrusions along respective sulcus gripping parts.
Figure 12:
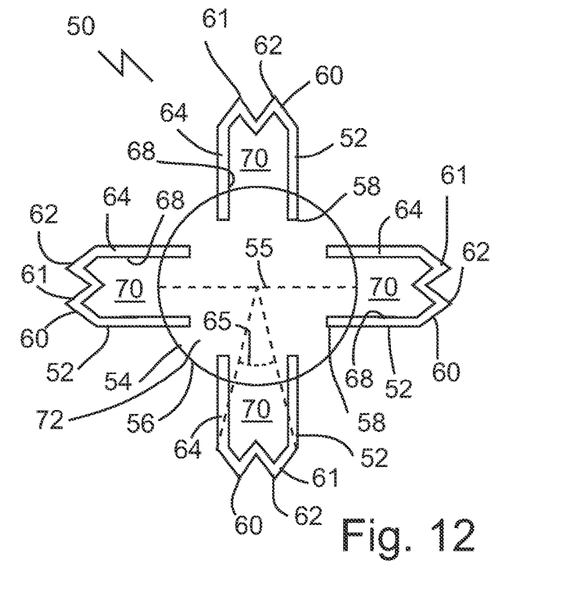
FIG. 12 is a front elevation view of a second embodiment of an MCLI, having an optic lens and four haptic arm assemblies, with a plurality of protrusions along respective sulcus gripping parts.
Figure 13:
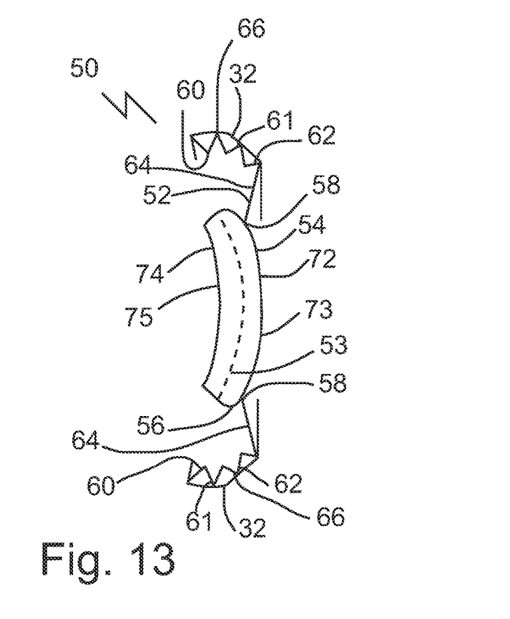
FIG. 13 is a side elevation view of a third embodiment of an MCLI positioned within a capsular lens bag of a human eye, having an optic lens and two arcuate haptic arms with a plurality of protrusions along respective sulcus gripping parts.
Figure 14:
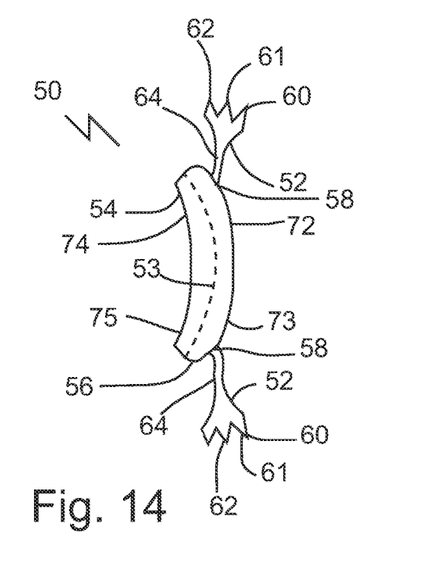
FIG. 14 is a side elevation view of a fourth embodiment of an MCLI, having an optic lens and two opposed haptic arms with a plurality of protrusions along respective sulcus gripping parts.

Referring to FIGS. 11-14, the lens 54 of the IOL 50 may have a suitable shape. As above, the anterior face 72 of the lens 54 may have a convex curvature. The posterior face 74 of the lens 54 may have a convex curvature. The convex cross-sectional profile 73 of the anterior face 72 may have a greater degree of curvature than the concave cross-sectional profile 75 of the posterior face 74. Other curvature relationships are possible, including ones where the profile 75 has more or the same curvature as profile 73. The lens 54 may be a suitable size, and may define a diameter 55 across the lens 54. The curvature of the anterior face 72 may depend on the curvature of the posterior face 74, for example, the curvatures may be selected to provide a desired range of dioptric power, using the formula of the sum of the curvature of the anterior face 72 in diopters and the curvature of the posterior face 74 in diopters, to equal the dioptric power of the lens 54. Example dioptric power desired in an IOL may be from 15-25 diopters, although larger or smaller power levels may be used. Referring to FIGS. 13 and 14, an outer edge 56 of the lens 54 may be shaped with a non-zero curvature. The curvature of the outer edge 56 of the lens 54 may provide a smooth transition from the convex curvature of the anterior face 72 to the concave curvature of the posterior face 74. The anterior curvature of the IOL 50 may be increased such that the lens 54 is in contact in use with the iris so that when the pupil contracts the iris can push the lens 54 backward, resulting in a greater degree of focusing on a near object. With more curvature, the dioptric power is increased, imitating normal near vision without reading glasses. The IOL 50 may be configured to ensure that an outer edge is relatively hidden by the iris when the pupil dilates in the relative darkness at night, thus diminishing or eliminating night glare. In some cases, while using a conventional IOL, while driving at night, the pupil 14 may be relatively wide and the edge of the implanted lens 54 may be exposed to incoming light, such as light coming from an approaching vehicle or street lights. Such may cause an annoying glare to the user and my make driving at night difficult. Thus, by making a lens 54 sufficiently wide to hide the edge of the lens 54 behind the pupillary edge of a dilated pupil 14, the glare otherwise experienced at night by the user may be reduced or avoided. The concave curvature of the posterior of the IOL 50 may provide additional dioptric power when the lens is pushed backward. The anterior curvature of the lens 50 may be increased because the posterior curve is made concave, keeping desired dioptric power the same as present conventional lenses, with increased curvature increasing the force of the papillary constriction to push the lens posterior. The decreased curve of the posterior surface of the lens may decrease chance of damage to the back surface of the lens during laser capsulotomy of the posterior capsule, or during other procedures where the IOL 50 remains in the eye.

Figure 15:
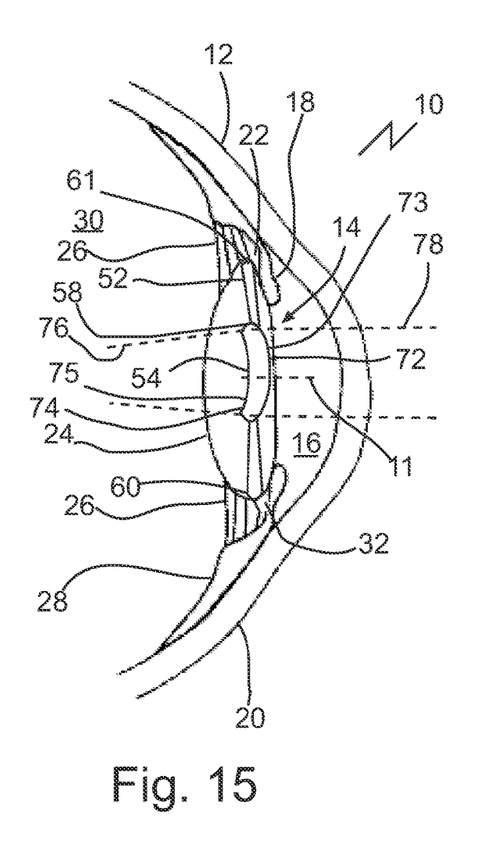
FIG. 15 is a cross-sectional side view of an embodiment of an MCLI positioned in a human eye after the removal of the natural crystalline lens, in which the ciliary muscles are shown relaxed, with the lens zonules taut, such that the lens is accommodating for far-sighted viewing of a distant focal point, with focal lines of light illustrated with dashed lines and travelling from the focal point and through the MCLI.
Figure 16:
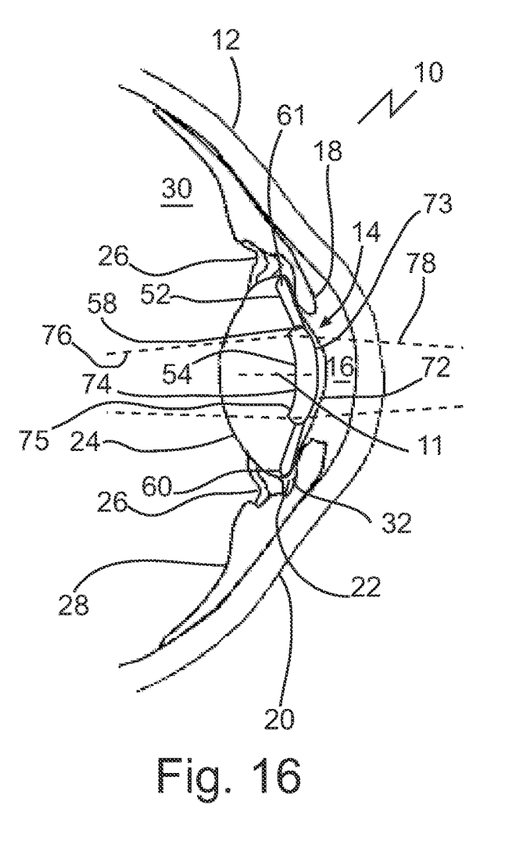
FIG. 16 is a cross-sectional side view of the MCLI and eye combination of FIG. 15 in which the ciliary muscles are contracted and the lens zonules are slacked, such that the lens is accommodating for near-sighted viewing of a nearby focal point (relative to the focal point in FIG. 15), with focal lines of light illustrated with dashed lines and travelling from the focal point and through the MCLI.

Referring to FIGS. 11-16, the IOL 50 may have a plurality of haptics 52 with suitable characteristics. In some cases, the haptics 52 may have one, or more, or all of the features of haptics 104, and vice versa. The optic lens 54 may be sized to fit within a capsular lens bag 24 of an eye 10. The plurality of haptics 52 may be angularly spaced around and radially extended from the optic lens 54. Referring to FIGS. 13-14, the haptics 52 may be attached anteriorly to the optic lens 54, for example anterior, or more anterior than posterior, of a central profile 53 of the lens 54 defined perpendicular to the axis 11, and/or attached to the anterior face 72. Referring to FIGS. 15-16 anterior attachment may assist the implantable accommodating IOL 50 to move forward during ciliary muscle contraction, and may assist with implantation by facilitating the ability of the IOL 50 to assume a compact, folded state for implantation. By attaching the haptics to the anterior surface, the force is directed to push the lens backward, and the constricting pupil also pushes the lens backward, in use. In some cases, the haptics may be attached to the posterior surface or edge of the IOL. Referring to FIGS. 15 and 16, during implantation, the implantable accommodating IOL 50 may be inserted into the capsular lens bag 24 of an eye 10 with or without the removal of the natural crystalline lens in what is known as a pseudophakic or phakic surgical procedure, respectively. Each haptic 52 may be structured to move or be biased, under contraction and expansion of ciliary muscles 28 of the eye 10, to adjust one or more of a position or shape of the optic lens to accommodate a focal power of the eye 10. Inserting the IOL 50 into the capsular lens bag 24 of the eye, may be done through an incision in an anterior portion of the capsular lens bag 24. The IOL 50 may be positioned so that an arcuate sulcus gripping parts 120 of the plurality of haptics 52 are inserted into and follow a circumferential groove 33 of the sulcus 32 to grip the sulcus 32.

Referring to FIGS. 11-14, the haptics 52 may have suitable characteristics, including one or more or all of the characteristics of haptics 52. The implantable accommodating IOL 50 may have haptics 52 with an arm 64 that defines a first, anchor end 58, for example that originates at the optic lens 54, and a second, sulcus end 61 that may define the tongue 60. The anchor end 58 of the haptic 52 may be directly attached to the optic lens 54, for example the haptic 52 may be attached to the anterior face 72 of the lens 54 of the IOL 50. The sulcus end 61 may form the arcuate sulcus gripping part 66 to aid in attachment to the sulcus 32 of the eye 10. Referring to FIGS. 13-14, each arm 64 may be a single arm, and referring to FIGS. 11-12, each haptic 52 may be formed of two or more arms 64, for example forming a haptic bridge as shown. The implantable accommodating IOL 50 may have a suitable number and arrangement of haptics 52. For example, in FIG. 11, the embodiment has two haptics 52, opposed from one another. In FIG. 12 the IOL 50 has four haptics 52. A relatively increased number of haptics 52 may help distribute the force of the ciliary muscles 28 evenly across the optic lens 54, thereby leading to more effective accommodation of the IOL 50 as opposed to only two haptics 52. Any suitable number of haptics 52 may be used. In some cases, the implantable accommodating IOL 50 may have between two and eight haptics.

Referring to FIGS. 11-16, each haptic 52 may have a tongue 60 that forms an arcuate sulcus gripping part 66. In use within the capsular lens bag 24, the gripping part 66 may insert into and follow a circumferential groove 33 of the sulcus 32 to restrict circumferential sliding of the tongue 60 around the sulcus 32. A plurality of haptics 52 may contain tongues 60 that insert into and follow the circumferential groove 33 of the sulcus 32 of the eye 10. The use of sulcus gripping parts may prevent rotation of the lens 54 about an optical axis 11 of the eye 10. An optical axis 11 may be defined as a line that passes through a center of the eye 10 and a center of the pupil 14. In use, the implantable accommodating IOL 50 may be fitted within a capsular lens bag 24 of an eye 10, with the respective tongues 60 of the plurality of haptics 52 inserted into and following the circumferential groove 33 of the sulcus 32 of the eye 10. The haptics 52 may be configured to bias or move the IOL 50 in a posterior direction under contraction of the ciliary muscles 28 of the eye 10 to increase a dioptric power of the IOL 50.

Referring to FIGS. 11-14, the haptics 52 of the IOL 50 may take a variety of forms. The haptics 52 may have a single or double arm 64, although only double arm versions are shown in these figures. Haptics 52 with a single arm 64 may have the indented profile 62 at the sulcus end 61 extend in one lateral direction or in two lateral directions. Referring to FIGS. 11-12, the arms 64 of the double armed 64 haptics 52, may be connected at the sulcus end 61 by the indented profile 62 of the haptic 52, forming a haptic bridge. The double armed 64 haptic 52 may be anchored to the lens 54 of the IOL 50 at the anchor end 58 of both arms 64. The lens 54, double arms 64 and the indented profile 62 of the haptic may define a cutout or gap 70, which may be defined from the inner edge 68 of the haptic 52. The plurality of haptics 52 may be spaced out at various intervals around the lens 54.

Referring to FIGS. 11-14, the IOL 50 may comprise a suitable material. The lens 54 may be made of material with a high refractive index. Materials with a high refractive index, such as 1.7 or higher, may allow the lens 54 to be made thinner relative to lower refractive index materials. Materials with a high refractive index may allow the posterior face 74 of the lens 54 to be increased in curvature, compared to if a material of a lower refractive index is used. Materials with a higher refractive index can bend incoming light more than material with a lower refractive index. Since material with a higher refractive index can bend light more readily, less material is need to achieve the same effect as material with a lower refractive index. One example of a high refractive index material is PMMA. Plural materials may be combined in one IOL, for example PMMA may be used for an exterior shell, with a silicon core.

Referring to FIGS. 15-16, the implantable accommodating IOL 50 may be implanted via a suitable method. In a suitable method an incision may be made in the eye 10 unless such incision is already present. Prior to inserting the implantable accommodating IOL 50, an incision may be formed into the cornea 12 and anterior chamber 16 of the eye 10. This method may not need to be performed if a patient has a pre-existing incision in the anterior chamber 16, for example if they previously had phakic or pseudophakic surgery and were simply replacing the implantable accommodation IOL 50. A surgeon may use a suitable tool to make the incision, for example lasers. The anterior chamber 16 incision may be used for the insertion of the implantable accommodating IOL 50. As above, a suitable implantation method may incorporate the destruction or removal of the natural crystalline lens of the eye 10. Referring to FIGS. 15-16, an implantation method may involve inserting the IOL 50 into the capsular lens bag of an eye 10 via a suitable method. Insertion may be carried out through the incision made prior in an anterior chamber 16 of the capsular lens bag 24 of an eye 10, such that the arcuate sulcus gripping parts 66 of the plurality of haptics 52 insert into and follow the circumferential groove 33 of the sulcus 32. The IOL 50 may be inserted in a compact, such as a folded, configuration, into the capsular lens bag 24, which may be advantageous to retain the IOL 50 in the bag 24 and also to reduce the size of incision required. The IOL 50 may be positioned more anterior when compared to the placement of other IOL's. The positioning of the IOL 50 being more anterior may allow the outer edge 56 of the implantable accommodating IOL 50 to be posterior an iris 18 of the eye 10 of the user. The IOL 50 being partially behind the iris 18 may allow decrease or eliminate night glare. which is a phenomenon in which a source of light does not help the user see better, but instead interferes with the user's vision.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An accommodation-facilitating intraocular implant comprising:
    a ring sized to fit within a capsular lens bag of an eye; and
    a plurality of haptics angularly spaced around and radially extended from the ring;
    in which each haptic:
        has a tongue that forms an arcuate sulcus gripping part that, in use within the capsular lens bag, inserts into and follows a circumferential groove of the sulcus to restrict circumferential sliding of the tongue around the sulcus; and
        is structured to move, under contraction and expansion of the ciliary muscles of the eye, to adjust the ring along an optical axis of the eye;
    in which the ring is made of rigid or resilient material, and the haptics and ring are structured, by having the haptics extended from one of opposed annular faces of the ring, to bias in use the ring to press against an implantable accommodating intraocular lens (IOL), located posteriorly of the ring within the capsular bag of an eye, to one or both deform or move the IOL in a posterior direction, under contraction of the ciliary muscles of the eye, to a greater extent than if the accommodation-facilitating intraocular implant was not present, to increase a dioptric power of the IOL to a sufficient extent such that the near-sighted viewing of a nearby focal point using the IOL is improved by the contact pressure of the ring against the IOL.

2. The accommodation-facilitating intraocular implant of claim 1 in which an inner annular edge of the ring defines an open void center.

3. The accommodation-facilitating intraocular implant of claim 1 in which a portion of the ring defined between inner and outer annular edges of the ring has a rectangular cross-sectional shape defined in a plane parallel with a central axis defined by the ring.

4. The accommodation-facilitating intraocular implant of claim 1 in which a radial width, of an intraocular-lens-contacting annular posterior face opposite an annular anterior face of the ring, is greater than an axial thickness defined between the intraocular-lens-contacting annular posterior face and the annular anterior face.

5. The accommodation-facilitating intraocular implant of claim 4 in which the radial width is four or more times greater than axial thickness.

6. The accommodation-facilitating intraocular implant of claim 1 in which a radial width, of an intraocular-lens-contacting annular posterior face opposite an annular anterior face of the ring, is smaller than a radius of an open void center defined by an inner annular edge of the ring.

7. The accommodation-facilitating intraocular implant of claim 1 in which outer and inner annular edges of the ring have a circular shape.

8. The accommodation-facilitating intraocular implant of claim 1 in which the ring comprising one or more of poly(methyl methacrylate) (PMMA) or stainless steel.

9. The accommodation-facilitating intraocular implant of claim 1 in which the ring comprises ultraviolet (A and B) absorbing material.

10. The accommodation-facilitating intraocular implant of claim 1 in which each haptic is attached to an annular anterior face of the ring.

11. An accommodating intraocular lens (IOL) assembly comprising:
- an implantable accommodating intraocular lens (IOL) within a capsular bag of an eye, the implantable accommodating IOL having an optic lens and a plurality of IOL haptics angularly spaced around and radially extended from the optic lens; and
- an accommodation-facilitating intraocular implant comprising a ring fitted within the capsular lens bag of an eye, anterior to and in contact with the optic lens;

in which the ring is made of rigid or resilient material, and the ring is biased, by having the haptics extended from one of opposed annular faces of the ring, to press against the optic lens, located posteriorly of the ring within the capsular bag of an eye, to one or both deform or move the optic lens in a posterior direction, under contraction of the ciliary muscles of the eye, to a greater extent than if the accommodation-facilitating intraocular implant was not present, to increase a dioptric power of the optic lens to a sufficient extent such that the near-sighted viewing of a nearby focal point using the IOL is improved by the contact pressure of the ring against the IOL.

12. The IOL assembly of claim 11 in which the accommodation-facilitating intraocular implant has a plurality of implant haptics angularly spaced around and radially extended from the ring.

13. The IOL assembly of claim 12 in which the plurality of implant haptics are inserted into the circumferential grove of the sulcus anterior relative to the plurality of IOL haptics.

14. The IOL assembly of claim 11 in which one or both:
- an inner diameter of the ring is smaller than an outer diameter of the IOL; and
- an outer diameter of the ring is larger than the outer diameter of the IOL.

15. A method comprising inserting the accommodation-facilitating intraocular implant of claim 1 into a capsular lens bag of an eye.

16. A method comprising:
inserting an accommodation-facilitating intraocular implant into a capsular lens bag of an eye, into contact with and anterior to an intraocular lens (IOL) that is also within the capsular lens bag, in which the accommodation-facilitating intraocular implant is inserted through an incision in an anterior portion of the capsular lens bag, to position the accommodation-facilitating intraocular implant such that:
- a plurality of haptics of the accommodation-facilitating intraocular implant are inserted into and follow a circumferential groove of the sulcus to grip the sulcus;
- under contraction and expansion of ciliary muscles of the eye, the plurality of haptics move to adjust the ring along an optical axis of the eye to adjust a dioptric power of the IOL to accommodate a focal power of the eye; and
- the ring is made of rigid or resilient material, and the haptics and ring bias, by having the haptics extended from one of opposed annular faces of the ring, the ring to press against the IOL, to one or both deform or move the IOL in a posterior direction, under contraction of the ciliary muscles of the eye, to a greater extent than if the accommodation-facilitating intraocular implant was not present, to increase a dioptric power of the IOL to a sufficient extent such that the near-sighted viewing of a nearby focal point using the IOL is improved by the contact pressure of the ring against the IOL.

* * * * *